(12) United States Patent
Luk

(10) Patent No.: US 8,328,488 B2
(45) Date of Patent: Dec. 11, 2012

(54) STUD RETAINER APPARATUS

(75) Inventor: Melodie S. Luk, Skokie, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1070 days.

(21) Appl. No.: 12/116,528

(22) Filed: May 7, 2008

(65) Prior Publication Data

US 2009/0028668 A1    Jan. 29, 2009

Related U.S. Application Data

(60) Provisional application No. 60/961,616, filed on Jul. 23, 2007.

(51) Int. Cl.
*F16B 37/00* (2006.01)
*F16L 3/22* (2006.01)
(52) U.S. Cl. .......................... 411/433; 411/437; 248/68.1
(58) Field of Classification Search ................ 411/433, 411/437, 511; 248/68.1
See application file for complete search history.

(56) References Cited

U.S. PATENT DOCUMENTS

| | | | | |
|---|---|---|---|---|
| 4,541,153 A | * | 9/1985 | Schaty | 24/305 |
| 4,550,891 A | * | 11/1985 | Schaty | 248/68.1 |
| 4,671,717 A | * | 6/1987 | Fukuhara | 411/182 |
| 4,728,236 A | * | 3/1988 | Kraus | 411/437 |
| 4,999,019 A | * | 3/1991 | Kraus | 411/512 |
| 5,033,701 A | * | 7/1991 | Kraus | 248/68.1 |
| 5,291,639 A | * | 3/1994 | Baum et al. | 24/297 |
| 5,302,070 A | * | 4/1994 | Kameyama et al. | 411/437 |
| 5,332,347 A | * | 7/1994 | Kimisawa | 411/182 |
| 5,598,994 A | * | 2/1997 | Olewinski et al. | 248/73 |
| 5,660,513 A | * | 8/1997 | Shibanushi | 411/433 |
| 5,816,762 A | * | 10/1998 | Miura et al. | 411/433 |
| 5,906,464 A | * | 5/1999 | Wedenig | 411/433 |
| 5,944,467 A | * | 8/1999 | Yuta | 411/433 |
| 6,070,836 A | * | 6/2000 | Battie et al. | 248/68.1 |
| 6,179,539 B1 | | 1/2001 | Benoit et al. | |
| 6,290,201 B1 | * | 9/2001 | Kanie et al. | 248/636 |
| 6,585,196 B2 | * | 7/2003 | Nakanishi | 248/68.1 |
| 6,598,836 B1 | * | 7/2003 | Leon | 248/74.1 |
| 6,708,931 B2 | * | 3/2004 | Miura | 248/68.1 |
| 6,883,762 B2 | * | 4/2005 | Miura et al. | 248/74.2 |

(Continued)

FOREIGN PATENT DOCUMENTS

EP       0603 063 B1    12/1993

(Continued)

OTHER PUBLICATIONS

International Search Report and Written Opinion for PCT/US2008/066237.

*Primary Examiner* — Victor Batson
*Assistant Examiner* — Tyler Johnson
(74) *Attorney, Agent, or Firm* — Mark W. Croll; Paul F. Donovan

(57) ABSTRACT

A connector assembly configured to secure at least one component to a structure may include a base, at least one member configured to receive and retain a portion of a component, and a stud retainer extending from the base. The stud retainer may include first and second engaging legs within a retaining chamber. The first and second engaging legs are configured to automatically align the stud retainer with respect to a stud that passes into the retaining chamber.

20 Claims, 3 Drawing Sheets

U.S. PATENT DOCUMENTS

| | | | |
|---|---|---|---|
| 6,915,990 B2 * | 7/2005 | Maruyama | 248/68.1 |
| 7,036,875 B2 * | 5/2006 | Kanie | 296/204 |
| 7,059,022 B2 * | 6/2006 | Yuta et al. | 24/297 |
| 7,267,307 B2 * | 9/2007 | Bauer | 248/65 |
| 7,316,374 B2 * | 1/2008 | Maruyama | 248/68.1 |
| 7,320,571 B2 * | 1/2008 | Kanie | 411/433 |
| 7,322,784 B2 * | 1/2008 | Castro et al. | 411/433 |
| 7,614,589 B2 * | 11/2009 | Kato | 248/55 |
| 7,651,057 B2 * | 1/2010 | Sedivy et al. | 248/68.1 |
| 7,658,350 B2 * | 2/2010 | Bauer | 248/65 |
| 7,891,151 B2 * | 2/2011 | Sano | 52/506.05 |
| 8,007,029 B2 * | 8/2011 | Sano | 296/180.1 |
| 8,061,948 B2 * | 11/2011 | DeGelis | 411/546 |
| 2003/0010874 A1 * | 1/2003 | Nakanishi | 248/68.1 |
| 2004/0065785 A1 * | 4/2004 | Miura et al. | 248/62 |
| 2004/0144897 A1 * | 7/2004 | Maruyama | 248/68.1 |
| 2004/0217236 A1 * | 11/2004 | Shibuya | 248/68.1 |
| 2006/0099049 A1 * | 5/2006 | Peterson | 411/433 |
| 2007/0194190 A1 | 8/2007 | Kurth | |
| 2007/0248436 A1 * | 10/2007 | Sano | 411/175 |

FOREIGN PATENT DOCUMENTS

| | | |
|---|---|---|
| EP | 1083341 A1 | 3/2001 |
| GB | 2160576 A | 12/1985 |
| WO | WO 2005095836 A | 10/2005 |

* cited by examiner

STUD RETAINER APPARATUS

RELATED APPLICATIONS

This application relates to and claims priority benefits from U.S. Provisional Patent Application No. 60/961,616 entitled "Stud Retainer," filed Jul. 23, 2007, which is hereby incorporated by reference in its entirety.

FIELD OF THE INVENTION

Embodiments of the present invention generally relate to a stud retainer apparatus, and more particularly to a self-centering/aligning stud retainer apparatus that may be easily secured to various types of studs.

BACKGROUND OF THE INVENTION

Various components, such as conduits and tubes, may be secured to surfaces, such as walls, ceilings or the like, through fastening assemblies. For example, a cylindrical tube may be secured to a wall through a fastening assembly having a tube channel that snapably secures around a portion of the tube. The fastening assembly itself may be secured to the wall through a stud that is received and retained by the fastening assembly.

Conventional fastening assemblies are often not compatible with different types of studs. For example, one fastening assembly may be specifically designed to receive and retain a specific type of stud. Additionally, conventional fastening assemblies may be misaligned with respect to a particular stud. Thus, as the fastening assembly is secured to the stud, such as through a threadable engagement, the fastening assembly and/or the stud may be stripped, thereby reducing the retaining force exerted with respect to the fastening assembly and the stud.

SUMMARY OF THE INVENTION

Certain embodiments of the present invention provide a connector assembly configured to secure at least one component to a structure. The connector assembly may include a base, at least one member, such as a tube channel, configured to receive and retain a portion of a component, such as a tube or conduit, and a stud retainer. The member(s) may be formed on and/or within the base.

The stud retainer may extend from the base, and may include first and second engaging legs within a retaining chamber. The first and second engaging legs may be configured to automatically align the stud retainer with respect to a stud.

The stud retainer may include first and second walls, wherein the first and second engaging legs are secured to the first and second walls, respectively, through first and second flexible tethering beams, respectively. The first and second flexible tethering beams allow the first and second engaging legs to flex with respect to a central axis of the stud retainer. The tethering beams may be offset with respect to the first and second engaging legs. For example, the tethering beams may connect to the first and second walls at positions above or below the engaging legs. Also, the engaging legs may include a plurality of fingers configured to dig into an outer circumferential surface of the stud.

The first and second engaging legs may inwardly curve about a central axis of said stud retainer. The inwardly-curved nature maximizes the surface engagement between the engaging legs and outer surfaces of the stud. The engaging legs may curve or wrap around a radial distance of 90° about the central axis of the stud retainer. Optionally, the radial curvature may be more or less than 90° about the central axis of the stud retainer.

Certain embodiments of the present invention provide a stud retainer apparatus of a connector assembly configured to securely fasten at least one component to a structure. The connector assembly is configured to be secured to the structure through a stud. The stud retainer apparatus may include first and second lateral walls and first and second engaging legs.

The first and second lateral walls may be integrally connected to a base and a top wall. A retaining chamber may be defined between the first and second lateral walls and the top wall.

The first and second engaging legs may be secured to the first and second lateral walls, respectively, through first and second tethering beams, respectively. The first and second engaging legs may be configured to automatically align the stud retainer with respect to the stud.

Figure 1:
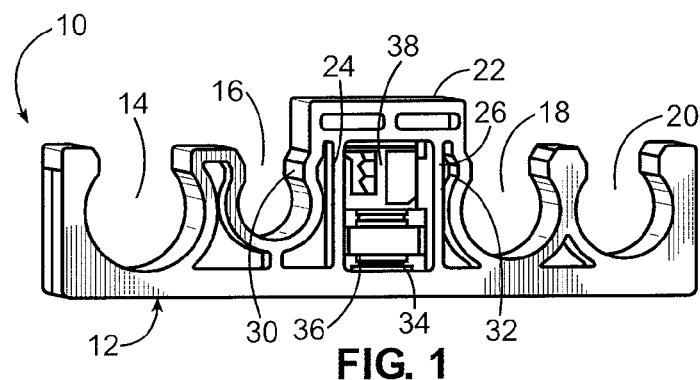
FIG. 1 illustrates an isometric view of a connector assembly, according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 2:
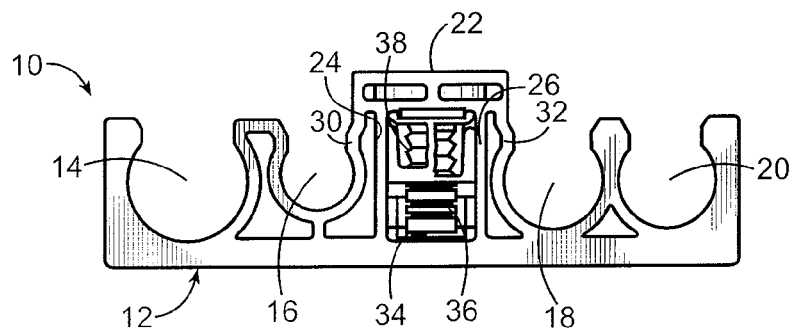
FIG. 2 illustrates a front view of a connector assembly, according to an embodiment of the present invention.

FIGS. 1 and 2 illustrate isometric and front views, respectively, of a connector assembly 10, according to an embodiment of the present invention. Referring to FIGS. 1 and 2, the connector assembly 10 includes a base 12 having a plurality of tube channels 14, 16, 18 and 20. Each tube channel 14, 16, 18 and 20 may be sized differently to accommodate different sized tubes (not shown). The tube channels 14, 16, 18 and 20 are configured to snapably and securely engage around outer circumferential surfaces of tubes. The connector assembly 10 may include more or less tube channels than those shown. Additionally, the connector assembly 10 may not include tube channels, but may include clamps, grooves, latches, claps, barbs or the like configured to securely retain other components, such as rails, beams or the like.

A stud retainer 22 extends from the base between the tube channels 16 and 18. As shown in FIGS. 1 and 2, the stud retainer 22 is generally centered on the base 12. The stud retainer 22 includes lateral walls 24 and 26 integrally connected to the base 12 and a top wall 28. The lateral wall 24 may also connect to a wall 30 defining the channel 16, while the lateral wall 26 connects to a wall 32 defining the channel 18. An opening (not shown) is formed through the base 12 underneath the stud retainer 22 and is configured to receive a stud. The opening leads to a stud passage 34 defined by a guide sleeve 36. The stud passage 34, in turn, leads to a retaining chamber 38.

Figure 3:
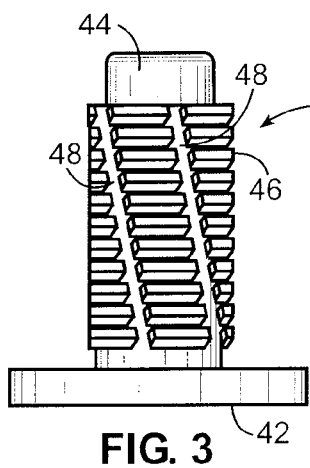
FIG. 3 illustrates a front view of a stud, according to an embodiment of the present invention.

FIG. 3 illustrates a front view of a stud 40, according to an embodiment of the present invention. The stud 40 includes a base 42 having a shaft 44 extending upwardly therefrom. The shaft 44 includes threads 46. A plurality of curved or pitched non-threaded channels 48 may extend over a length of the shaft 44, thereby separating sections of threads 46. The stud 40 is configured to be secured to a structure (not shown) and to be received and retained by the stud retainer 22 (shown in FIGS. 1 and 2). Various other studs may be used, such as those shown in FIGS. 4 and 5. Alternatively, instead of being threaded, the shaft 44 may include a series of pitched or curved flutes formed into the shaft 44.

Figure 4:
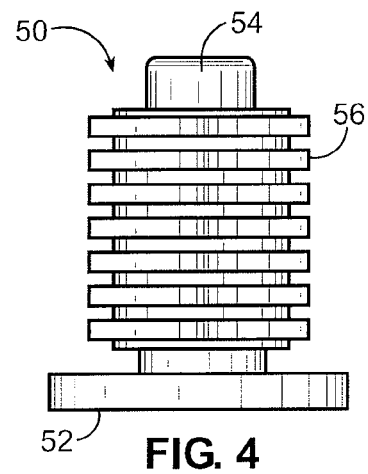
FIG. 4 illustrates a front view of a stud, according to an embodiment of the present invention.

FIG. 4 illustrates a front view of a stud 50, according to an embodiment of the present invention. The stud 50 includes a base 52 having a shaft 54 extending upwardly therefrom. The shaft 50 may also include threads 56. Unlike the stud 40, however, the shaft 50 may not include passages separating threaded sections. Instead, the threads 56 may wrap around the shaft 54. The stud 50 is configured to be secured to a structure (not shown) and to be received and retained by the stud retainer 22 (shown in FIGS. 1 and 2).

Figure 5:
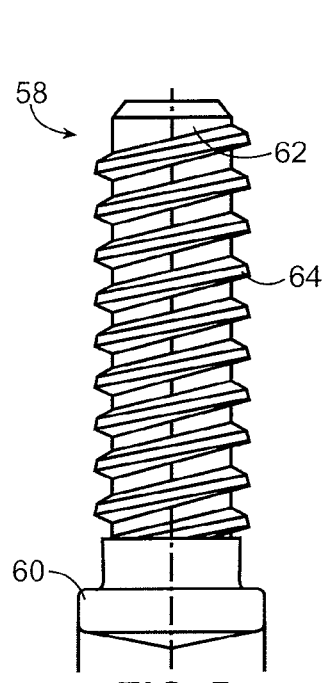
FIG. 5 illustrates a front view of a stud, according to an embodiment of the present invention.

FIG. 5 illustrates a front view of a stud 58, according to an embodiment of the present invention. The stud 58 includes a base 60 having a shaft 62 extending upwardly therefrom. The shaft 62 may include contiguous, pitched threads 64, instead of fluted areas or channels separating threaded portions. Optionally, the stud 58 may include channels or fluted areas separating threaded portions. The stud 58 is also configured to be secured to a structure (not shown) and to be received and retained by the stud retainer 22 (shown in FIGS. 1 and 2).

Figure 6:
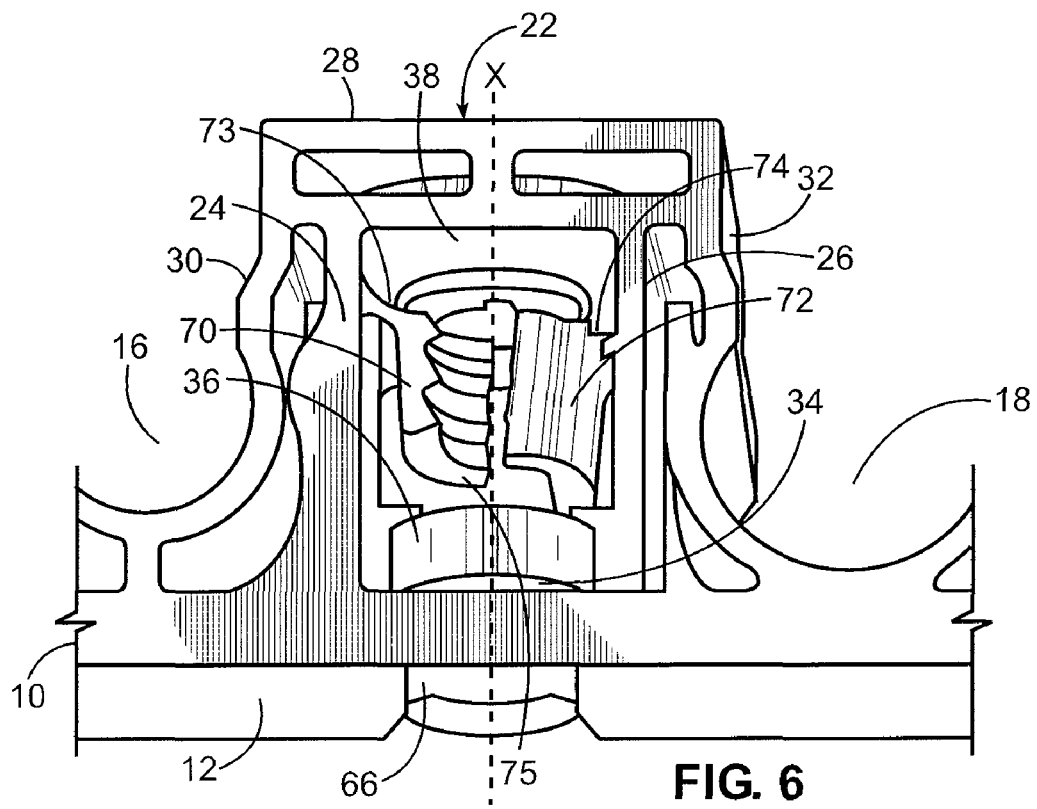
FIG. 6 illustrates an isometric view of a stud retainer, according to an embodiment of the present invention.

FIG. 6 illustrates an isometric view of the stud retainer 22. As shown, an opening 66 is formed through the base 12 and allows a stud to pass therethrough and into the stud passage 34. As the stud is threaded or passed into the opening 66 (or as the opening 66 of the base 12 passes, or is threaded around, the stud), the stud moves into the stud passage 34 where the guide sleeve 36 ensures that the stud moves into the retaining chamber 38.

The stud retainer 22 includes two opposed wrap-around legs 70 and 72. Optionally, the stud retainer 22 may include more legs than those shown. For example, three legs may be evenly spaced about a central axis of the stud retainer 22. The leg 70 is connected to the lateral walls 24 through a tethering beam 73, while the leg 72 is connected to the lateral wall 26 through a tethering beam 74. The outer surfaces of each leg 70 and 72 may be smooth and curved. The legs 70 and 72 are generally curved around a central axis X. The inner surface of each leg 70 and 72 includes a series of curved fingers 75 that include edges or teeth configured to dig or bite into the outer circumferential surface of a stud. The fingers 75 extend and curve along the legs 70 and 72. As shown, the leg 70 may include three stepped fingers 75 aligned with respect to one another.

The tethering beams 73 and 74 are flexible and act as spring members between the legs 70, 72 and the lateral walls 24, 26, respectively. As such, the legs 70 and 72 within the retaining chamber 38 are allowed to flex toward and away from the walls 24 and 26.

Figure 7:
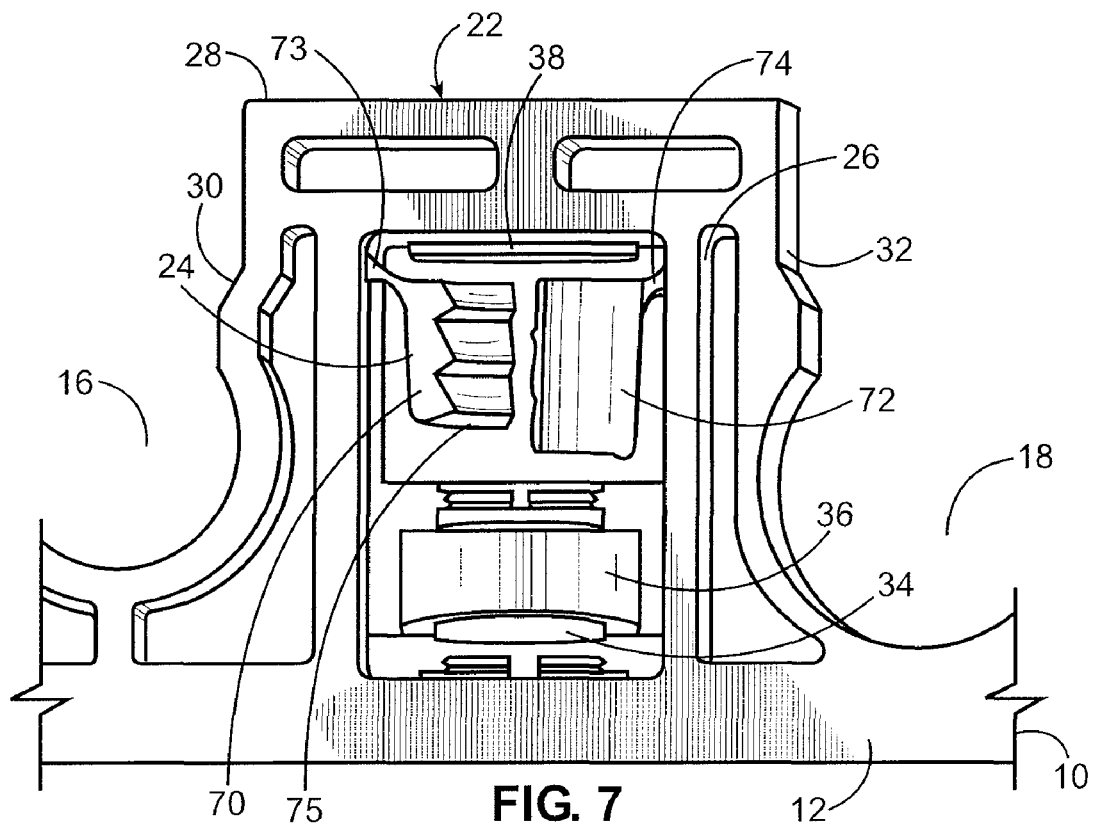
FIG. 7 illustrates a front view of a stud retainer, according to an embodiment of the present invention.

FIG. 7 illustrates a front view of the stud retainer 22. In general, the legs 70 and 72 are spaced apart from one another such that the fingers 75 on the inner surfaces thereof contact opposite arcuate sides of a stud. As shown in FIG. 7, in particular, the tethering beams 73 and 74 are offset with respect to the legs 70 and 72, respectively. That is, as shown in the orientation of FIG. 7, the tethering beams 73 and 74 extend from the lateral walls 24 and 26 above the legs 70 and 72, respectively. Thus, the tethering beams 73 and 74 are above the uppermost fingers 75. It has been found that this orientation allows the fingers 74 to inwardly collapse when a stud is being removed, either intentionally or unintentionally, from the stud retainer 22, or vice versa. The collapsing nature of the fingers 75 into the stud cause them to dig or bite into the stud and thereby provide a higher retaining force. Thus, embodiments of the present invention may be used with a wide variety of studs due to the fact that the legs 70 and 72 provide a secure retaining force by way of the fingers 75 digging into the stud. Optionally, the legs 70 and 72 may not be offset, such as if the stud retainer 22 is used with an annular ring stud in which the threads are not angled.

Figure 8:
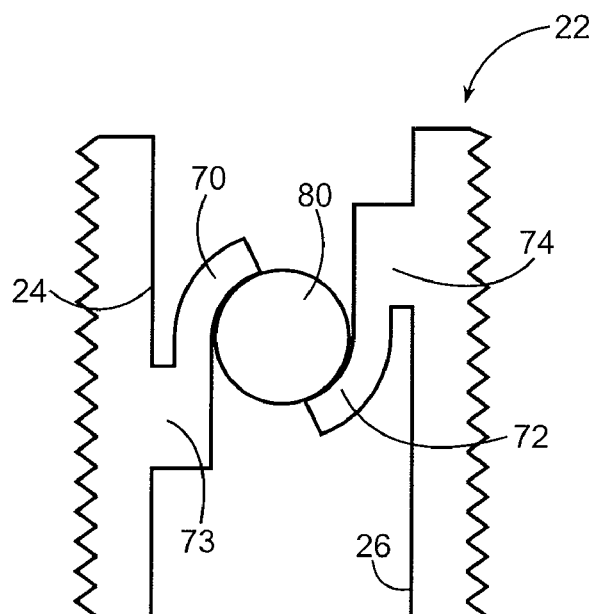
FIG. 8 illustrates an axial cross-sectional view of a stud retainer, according to an embodiment of the present invention.

FIG. 8 illustrates an axial cross-sectional view of the stud retainer 22. As shown in FIG. 8, each leg 70 and 72 may wrap around a stud 80 approximately 90°. However, each leg 70 and 72 may wrap around the stud 80 over a radial distance that is more or less than 90°.

Figure 9:
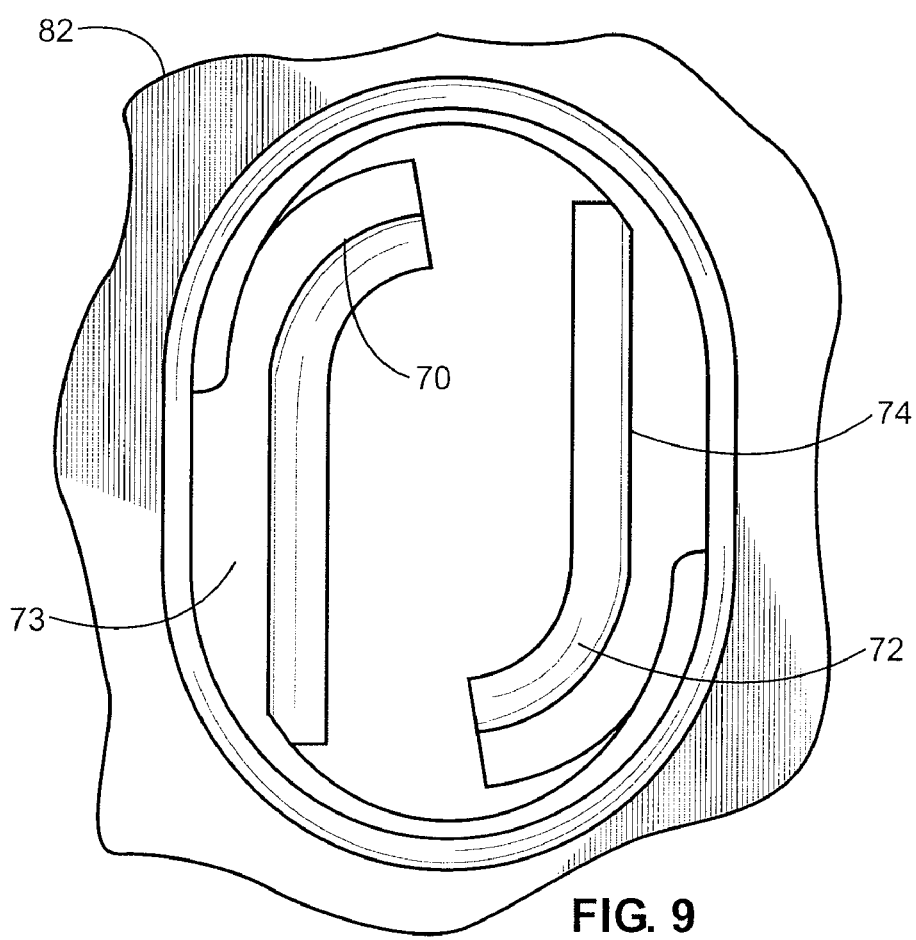
FIG. 9 illustrates a top view of a stud retainer, according to an embodiment of the present invention.

FIG. 9 illustrates a top view of a stud retainer 82, according to an embodiment of the present invention. As shown in FIG. 9, each leg 70 and 72 may wrap around a central axis of the stud retainer 22 over a radial distance that is not 90°.

Referring to FIGS. 6-9, the arcuate distance that each leg 70 and 72 wraps around the stud 80 or central axis of the stud retainer 22 may be the same in order to ensure that the forces exerted into the stud 80 are balanced and even. The lengths and sizes of the fingers 75 may vary in order to accommodate the pitch of a particular stud. Because some studs, such as the stud 50 shown in FIG. 4, may include contiguous threading, each of the fingers 75 may abut the stud at a different radial point with respect to the central longitudinal axis of the stud. The optimal sizes and lengths of the fingers 75 may vary depending on the threading of the stud.

The tethering beams 73 and 74 allow the stud retainer 22 to self center onto the stud. That is, the tethering beams 73 and 74 allow the legs 70 and 72 to flex inwardly or outwardly with respect to the stud to accommodate uneven surfaces. For example, if the fingers 74 of the leg 70 abut the stud at a thread peak, the leg 70 may flex toward the lateral wall 24 by way of the tethering beam 73, in order to provide proper surface engagement. Further, if the fingers 74 of the leg 72 abut into a thread valley, the flexible nature of the leg 72 allows it to move into that surface.

Before a stud is passed into the stud retainer 22, the fingers 75 are generally an equal distance from the axial center of the stud retainer 22. The legs 70 and 72 abut the stud as it threads or otherwise passes into the retaining chamber 38, thereby preventing the stud from moving past the boundaries of the legs 70 and 72. As noted above, the guide sleeve 36 guides the stud into the retaining chamber 38.

As the stud passes into the retaining chamber 38, the fingers 75 of the legs 70 and 72 engage the stud. The legs 70 and 72 flex, by way of the tethering beams 73 and 74, respectively, in equal and opposite directions about the stud. The equal and opposite flexing of the opposed legs 70 and 72 acts to center the stud retainer 22 about the stud. The tethered legs 70 and 72 move independently of one another to ensure that the legs 70 and 72 engage the surfaces of the stud.

Thus, embodiments of the present invention provide a connector assembly having a stud retainer that automatically centers and aligns with respect to a stud. Further, embodiments of the present invention provide a stud retainer that securely engages a stud through fingers that bite or dig into outer circumferential walls of the stud, thereby providing an increased retaining force, as opposed to prior fasteners. Further, the wrap-around nature of the legs ensures maximum engagement between the fingers of the legs and the outer surfaces of the stud. As such, the stud retainer is ideally suited to retain different types of studs, whether they have standard threading, flutes, channels or the like.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A connector assembly configured to secure at least one component to a structure, the connector assembly comprising:
    a base;
    at least one member configured to receive and retain a portion of the at least one component, said at least one member being formed on and/or within said base; and
    a stud retainer extending from said base, wherein an opening is formed through said base underneath said stud retainer and is configured to receive a stud, said stud retainer comprising:
        first and second lateral walls connected to said base and a top wall, wherein a retaining chamber is defined between the first and second lateral walls, the base, and the top wall, wherein the stud retainer is configured to receive the stud into the retaining chamber through the opening in the base, which is distally located from said top wall;
        first and second flexible tethering beams extending into the retaining chamber from said first and second lateral walls, respectively, wherein said first flexible tethering beam extends from said first lateral wall from a first level that differs from a second level from which said second flexible tethering beam extends from said second wall;
        first and second engaging legs extending into said retaining chamber from said first and second flexible tethering beams, respectively, wherein said first and second tethering beams extend from said first and second lateral walls, respectively, above said first and second engaging legs, respectively, wherein said first and second engaging legs are sized differently, wherein each of said first and second engaging legs comprises a plurality of fingers configured to dig into an outer circumferential surface of the stud, wherein said first and second engaging legs are opposed to one another, wherein said first and second engaging legs are configured to automatically align said stud retainer with respect to the stud; and wherein said first and second flexible tethering beams allow said first and second engaging legs to flex with respect to a central axis of said stud retainer.

2. The connector assembly of claim 1, wherein the component is a tube and said at least one member comprises a tube channel configured to snapably secure around an outer circumferential area of a tube.

3. The connector assembly of claim 1, wherein said first and second flexible tethering beams are offset with respect to said first and second engaging legs.

4. The connector assembly of claim 1, wherein said first and second engaging legs inwardly curve about a central axis of said stud retainer.

5. The connector assembly of claim 4, wherein each of said first and second engaging legs curves a radial distance of 90° about the central axis of said stud retainer.

6. The connector assembly of claim 4, wherein each of said first and second engaging legs curves a radial distance greater than 90° about the central axis of said stud retainer.

7. The connector assembly of claim 4, wherein each of said first and second engaging legs curves a radial distance less than 90° about the central axis of said stud retainer.

8. The connector assembly of claim 1, further comprising a guide sleeve defining a stud passage that leads into said retaining chamber, said guide sleeve configured to guide the stud into said retaining chamber.

9. A stud retainer apparatus of a connector assembly configured to securely fasten at least one component to a structure, wherein the connector assembly is configured to be secured to the structure through a stud, the stud retainer apparatus comprising:
    first and second lateral walls integrally connected to a base and a top wall that is distally located from said base, wherein a retaining chamber is defined between said first and second lateral walls, said base, and said top wall, wherein an opening is formed through said base and is configured to allow the stud to pass into said retaining chamber;
    first and second engaging legs secured to said first and second lateral walls, respectively, through first and second tethering beams, respectively, that extend from said first and second lateral walls, respectively, proximate said top wall, wherein said first and second tethering beams extend from said first and second lateral walls, respectively, above said first and second engaging legs, respectively, wherein said first and second engaging legs are sized differently, wherein said first flexible tethering beam extends from said first lateral wall from a first level that differs from a second level from which said second flexible tethering beam extends from said second lateral wall, wherein each of said first and second engaging legs comprise a plurality of fingers configured to dig into an outer circumferential surface of the stud, and wherein said first and second engaging legs are configured to automatically align said stud retainer with respect to the stud.

10. The stud retainer apparatus of claim 9, wherein said first and second flexible tethering beams allow said first and second engaging legs to flex with respect to a central axis of said stud retainer.

11. The stud retainer apparatus of claim 9, wherein said first and second flexible tethering beams are offset with respect to said first and second engaging legs.

12. The stud retainer apparatus of claim 9, wherein said first and second engaging legs inwardly curve about a central axis of said stud retainer.

13. The stud retainer apparatus of claim 12, wherein each of said first and second engaging legs curves a radial distance of 90° about the central axis of said stud retainer.

14. The stud retainer apparatus of claim 12, wherein each of said first and second engaging legs curves a radial distance greater than 90° about the central axis of said stud retainer.

15. The stud retainer apparatus of claim 12, wherein each of said first and second engaging legs curves a radial distance less than 90° about the central axis of said stud retainer.

16. The stud retainer apparatus of claim 9, further comprising a guide sleeve defining a stud passage that leads into said retaining chamber, said guide sleeve configured to guide the stud into said retaining chamber.

17. A connector assembly configured to secure a plurality of tubes to a structure, wherein the connector assembly is secured to the structure through a stud, the connector assembly comprising:
 a base;
 a plurality of tube channels on and/or within said base, each of said plurality of tube channels configured to receive and retain a portion of a tube or conduit; and
 a stud retainer extending from said base, wherein an opening is formed through said base underneath said stud retainer and is configured to receive the stud, said stud retainer comprising:
  first and second engaging legs within a retaining chamber, wherein said first and second engaging legs are sized differently, said first and second engaging legs comprising a plurality of aligned fingers configured to dig into an outer circumferential surface of the stud, wherein said first and second engaging legs inwardly curve about a central axis of said stud retainer, said first and second engaging legs configured to automatically align said stud retainer with respect to the stud;
  first and second lateral walls connected to said base and a top wall that is distally located from said base, wherein said first and second engaging legs are secured to said first and second lateral walls, respectively, through first and second flexible tethering beams, respectively, wherein said first and second tethering beams extend from said first and second lateral walls, respectively, above said first and second engaging legs, wherein said first flexible tethering beam extends from said first wall from a first level that differs from a second level from which said second flexible tethering beam extends from said second wall, wherein said first and second flexible tethering beams allow said first and second engaging legs to flex with respect to a central axis of said stud retainer, wherein said first and second flexible tethering beams are offset with respect to said first and second engaging legs; and
  a guide sleeve defining a stud passage that leads into said retaining chamber, said guide sleeve configured to guide the stud into said retaining chamber.

18. The connector assembly of claim 17, wherein said first and second flexible tethering beams are connected to said first and second walls, respectively, distally from said base.

19. The connector assembly of claim 1, wherein said first and second flexible tethering beams are connected to said first and second walls, respectively, distally from said base.

20. The connector assembly of claim 9, wherein said first and second flexible tethering beams are connected to said first and second lateral walls, respectively, at levels that are above said first and second engaging legs.

* * * * *